Nov. 19, 1963  C. A. FLOOD  3,111,446
LABEL APPLYING MACHINES
Filed Sept. 28, 1961  5 Sheets—Sheet 1

INVENTOR.
Carl A. Flood
BY
Roberts, Cushman & Grover
ATT'YS

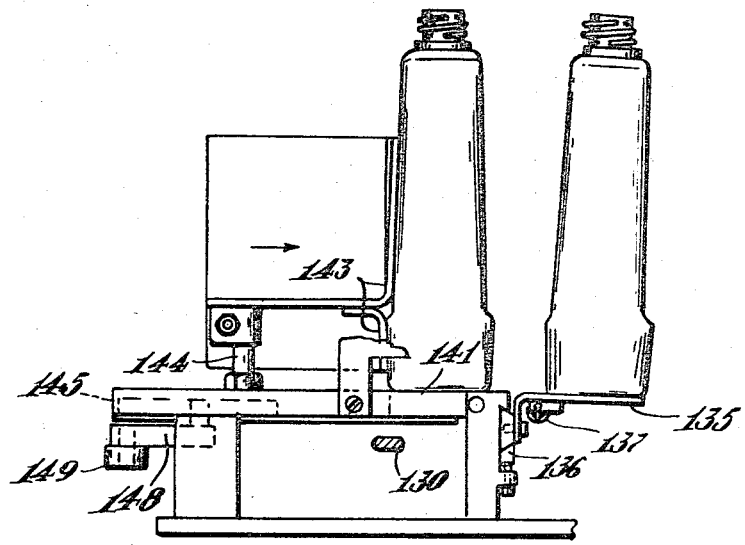
Fig. 4
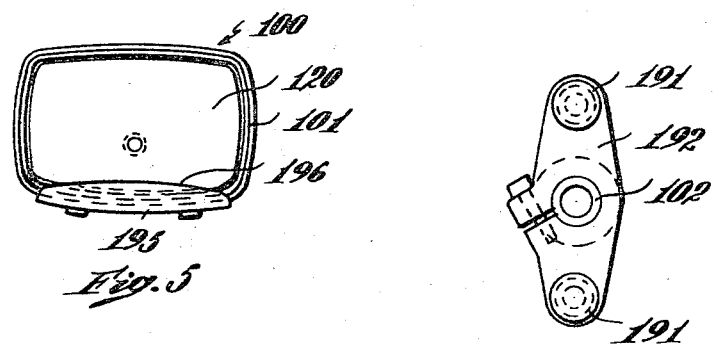
Fig. 5
Fig. 7
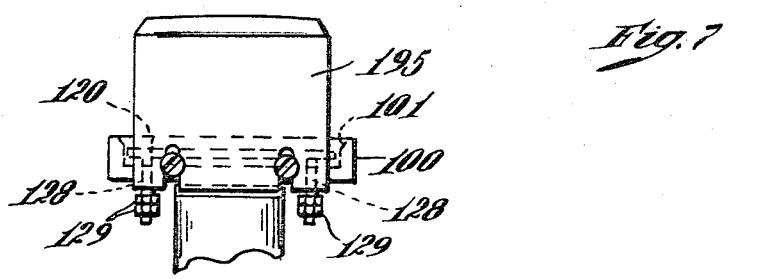
Fig. 6

Nov. 19, 1963     C. A. FLOOD     3,111,446
LABEL APPLYING MACHINES
Filed Sept. 28, 1961     5 Sheets-Sheet 5

United States Patent Office 3,111,446
Patented Nov. 19, 1963

3,111,446
LABEL APPLYING MACHINES
Carl A. Flood, Framingham, Mass., assignor to Dennison Manufacturing Company, Framingham, Mass., a corporation of Massachusetts
Filed Sept. 28, 1961, Ser. No. 141,477
8 Claims. (Cl. 156—475)

This invention provides machines for transferring labels; by which are included decorative designs, from a continuous label-carrying strip onto surface portions of articles, for instance bottles. The invention preferably makes use of some of the features of my United States Patent No. 2,981,432, granted April 25, 1961, and patent application Serial No. 1,376, filed January 8, 1960, now Patent No. 3,064,714, and may use label-carrying strips made according to the United States patent of Ridgley G. Shepherd, Jr., No. 2,862,832 granted December 2, 1958.

For labeling curved surface portions of bottles whose cross sectional shape is not completely circular, it has been the practice to provide a rotatable turret of selected diameter such that the curved label-receiving areas of the bottles are concentric with the turret axis. Such a turret may have for example three bottle receiving stations as in the case of the turret of FIG. 14 of said Patent No. 2,981,432 and be indexed 120° for each label applying cycle.

Machines of that type have a considerable capacity for adjustment and interchange of parts to suit various requirements. Because many different designs of bottles will be encountered the turret has been incorporated in a sub-frame of the machine. A turret and the sub-frame therefor appropriate to the particular bottle shape will then be provided for any particular case. The diameter of the turret, in the case of generally oval shaped bottles, will be such that the label-receiving area of each bottle is concentric with the turret axis and the turret axis will be located in such position that the label-receiving area of the bottle will be presented to the rotary die and the intervening label carrier strip at the line of transfer.

The present invention provides a simple means for increasing the capability of heat transfer labeling machines to accommodate bottles having a greater range of curved shapes of label-receiving areas. Thus the present invention enables a shift from one curved bottle shape to another curved bottle shape to be made with only a minimum of structural change of the bottle handling mechanism of the machine. The invention is particularly useful in adapting a machine to handle bottles whose label-receiving areas have large radii of curvature, which with prior machines would require correspondingly large diameter turrets. In a sense, the invention may be regarded as freeing an important class of machines from the limitations heretofore imposed by the rotary turret. The present invention even permits handling of bottles having reentrant curvature, and by way of example the invention will be so described.

In the accompanying drawings:

FIG. 4 is a right side elevation, omitting some parts particularly those better shown in FIG. 3;

FIG. 5 is a detail view in plan showing the movable holder for the base of a bottle;

FIG. 6 is an elevation showing a bottle-restraining element attached to the bottle holder of FIG. 5;

FIG. 7 is a bottom view showing cam followers which turn the bottle holder; and

Figure 1:
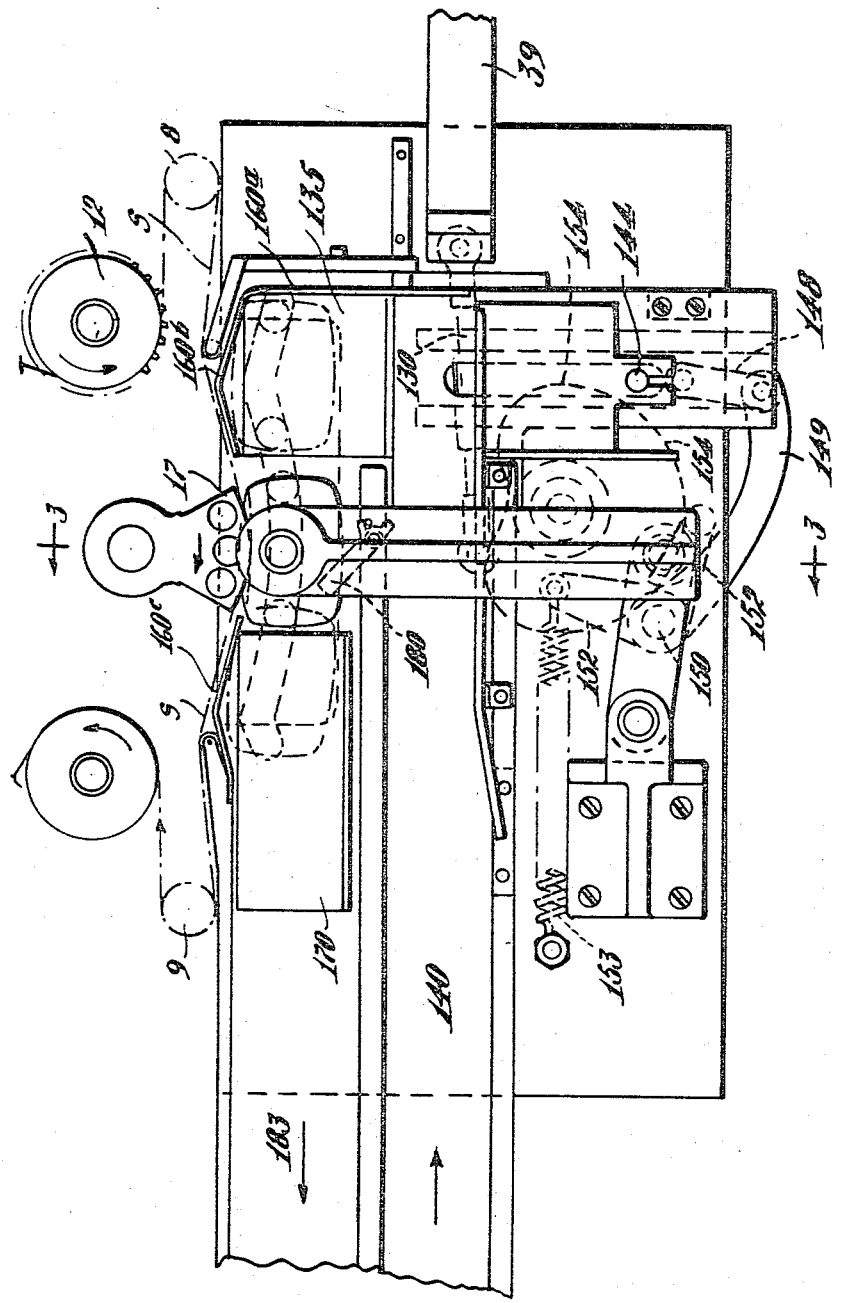
FIG. 1 is a view generally in the nature of a plan, showing apparatus of the present invention.

The machine as in my said Patent No. 2,981,432 includes a continuously rotating transfer iron or die having a heated segmental die portion 17, suitable supply and take-up spools (not shown) for the continuous label-carrier strip S, a feeding sprocket 12 for the strip and an oscillating slide for modifying the motion of the strip and corresponding to slide 11 of said patent. For simplicity the slide is not here shown in detail, merely its strip-guiding rolls 8 and 9 being indicated. The back and forth motion of these rolls 8 and 9 accommodates the linear speed of the strip S to the surface speed of the die throughout a part of the cycle which includes the time during which the surface of the die is active. In FIG. 1 the die 17 is active and its surface is halfway across the transfer line which coincides with line 3—3. The label-carrier strip S under the combined influences of the winding-up, the oscillating motion of the slide including rollers 8 and 9, and the rotation of sprocket 12, passes across the transfer line at the speed of the die surface. The bottle, carried by the moving bottle holder subsequently described also moves past the transfer line with its label-receiving surface at the speed of the strip S and die 17.

The bottle holder includes a cup 100 having a beveled rim 101 shaped to fit the generally rectangular but somewhat rounded-sided base portion of the bottle B. Cup 100 has a downwardly extending tubular extension 102 (FIG. 3) which is rotatable in a bearing within a boss 104 formed at the end of the lower horizontal arm 109 of a yoke generally indicated by the reference character 110.

Figure 3:
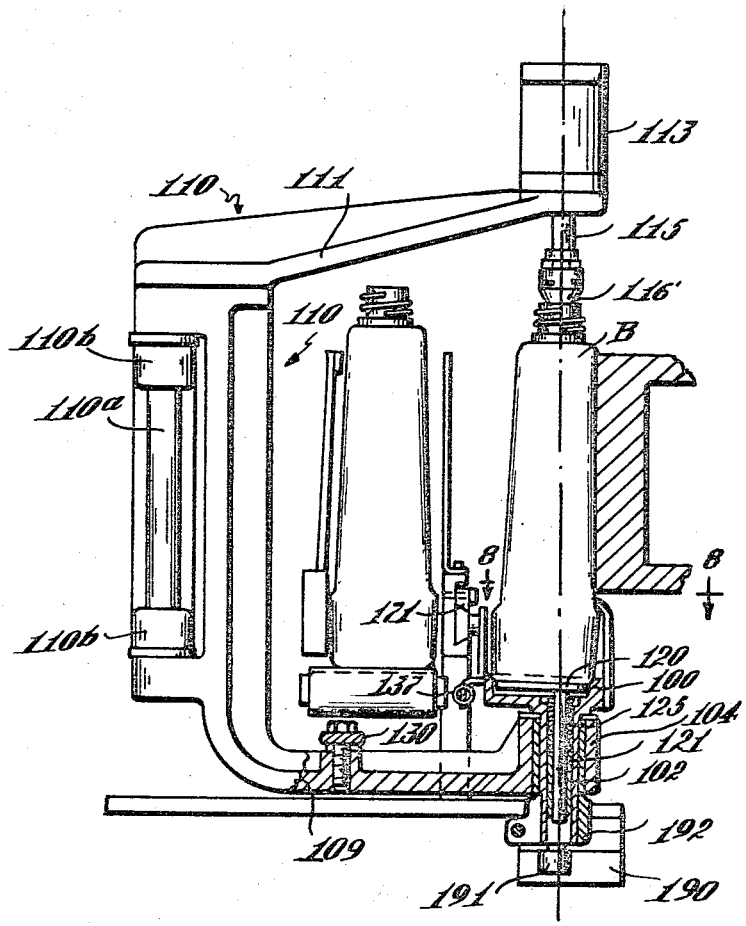
FIG. 3 is a view taken generally on the line 3—3 of FIG. 1.

The upper arm 111 of yoke 110 carries an actuating device including a cylinder 113 adapted to project downwardly and to retract upwardly a tube 115 having a rotatable nozzle 116 adapted to extend into the mouth of the bottle as in FIG. 3.

As in my said patent and application the nozzle serves the double purposes of holding the bottle down and inflating it with air under pressure, this latter to impart the desired temporary solidity to plastic bottles.

The projection of the nozzle into the bottle, the application of air under pressure to the bottle, the cutting off of the air and the retraction of the nozzle are in timed relation to the rotation of the die as in my said patent and application so that the bottle is inflated and held down prior to arrival of the active die surface at the transfer line and the bottle is released only after the transfer has been effected. The actuating cylinder 113 may either project the tube 115 when air under pressure is applied to the cylinder and retract the tube by means of a spring when air is cut off from the cylinder as in my said patent, or may be in constant communication with the inflating air and use an intermittent supply of air under pressure to retract the tube and shut off the inflating air therefrom, employing a spring to project the tube and admit inflating air thereto as in said application.

As indicated in FIG. 3 the axis of tube 115 and nozzle 116 is in prolongation of the axis of the rotatable sleeve portion 102 of the bottom-holding cup 100. This common axis, throughout the travel of the bottle past the transfer line as subsequently described, remains parallel with the transfer line though changing position relative thereto in two directions.

Within the cup 100 there is provided a platform 120 carrying a plunger 121 extending within tubular part 102. A spring 125 urges the platform 120 upwardly. Two small plungers 128 (FIG. 6) extending from platform 120 down through the bottom of the cup 100 carry stop nuts 129 which limit the upward motion of platform 120. Thus when no bottle is present at the cup or when a bottle sits on the platform 120 without being pressed down by the nozzle 116, platform 120 lies flush with the rim of the cup. Thus a bottle may be laterally slid onto and off from the platform at the proper times, whereas while the nozzle 116 is projected downwardly the bottle seats within the beveled rim 101 and is therefore fixed relative to the cup 100.

The primary yoke 110 is pivotally connected by a pin 110a (FIGS. 2 and 3) to a secondary yoke 110b which in turn is pivotally connected by a pin 110c (FIG. 2) to a stationary yoke or standard 110d.

The cup 100, nozzle 116 and associated parts are given an oscillating back and forth motion past the transfer line in timed relation to the presentation of the die 17 at the transfer line. This is most simply accomplished by link 130 pivotally inter-connecting the primary yoke 110 with the cam-driven slide such as 39 or 39' of my said patent. In the device of said patent the cam connections operating slide 39 or 39' are adjustable not only as to the stroke of this slide but also as to the direction of its uniform motion during presentation of the active surface of the iron or die 17. In the present device these connections are to be set so that the slide 39 is in motion to the left, FIG. 1, throughout the time the die surface is active, the return movement to the right taking place while the die surface is inactive.

Figure 8A:
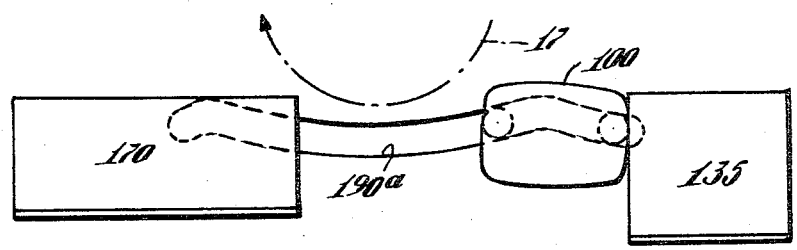
FIG. 8a to 8d are diagrams showing positions through which the bottle holder is carried, FIGS. 8d and 8c also indicating parts of the bottle.
Figure 8B:
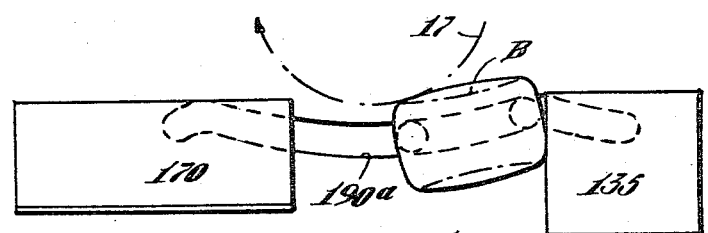
Figure 8C:
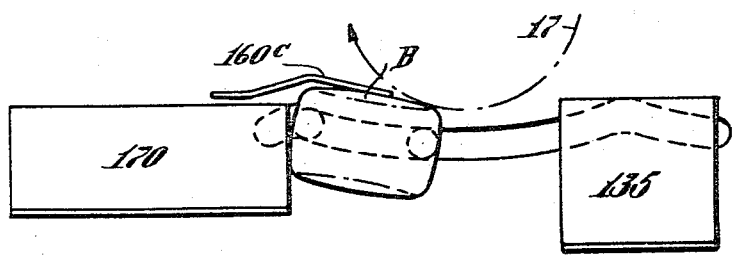
Figure 8D:
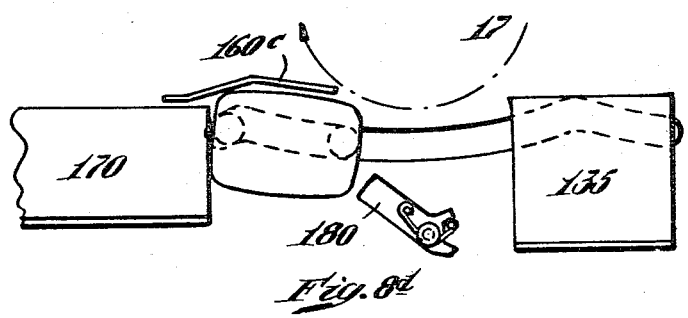

The cup 100 moves from its extreme right hand position of FIG. 8a to its extreme left hand position of FIG. 8d and returns.

The right hand extreme position of the cup 100 is normally occupied by a plate 135 slidable in a guide way 136 and urged to its position of FIG. 1 by a spring 137, this plate being displaceable to the right in FIG. 1 or toward the observer in FIG. 4 by the cup 100.

Bottles to be labeled may be delivered by an endless conveyor 140 onto a platform 141 (FIG. 2) from whence they are pushed one at a time onto the plate 135 by a pusher member 143, FIG. 4, which is mounted on a post 144 carried by a slide 145 in platform 141. A link 148, FIG. 1 connects the slide 145 to a crank 149 fast on a vertical shaft 150. Fast on the lower end of a shaft 150 is a bell crank 152, one arm of which carries a cam-follower 153 (FIG. 2) following a heart-shaped disc cam 154. A spring 155 connected to the other arm of bell crank 152 urges the bell crank counter-clockwise in FIG. 1 thus to turn the shaft 150 and operate the pusher 143 as permitted by the rotation of the cam 154.

Cam 154 rotates in synchronism with the die 17, the shafts of these elements preferably being interconnected by a chain connection and the speed relation being such that the pusher operates once for each transfer operation of the die. If the die should have a plurality of segments the pusher should, of course, again operate once for each transfer operation.

When pushed onto the plate 135 the bottle is retained by guard fingers 160a and 160b, FIG. 1, which may be at several different levels above the plate 135. As cup 100 returns to its right hand position it displaces plate 135 from under the bottle and the bottle then sits on platform 120 of the cup. Nozzle 116 is then projected into the mouth of the bottle, pushing the bottle down so that it seats on the beveled rim of the cup.

The bottle receives the label as it moves across the transfer line from right to left, held between the nozzle 116 and cup 100.

Figure 2:
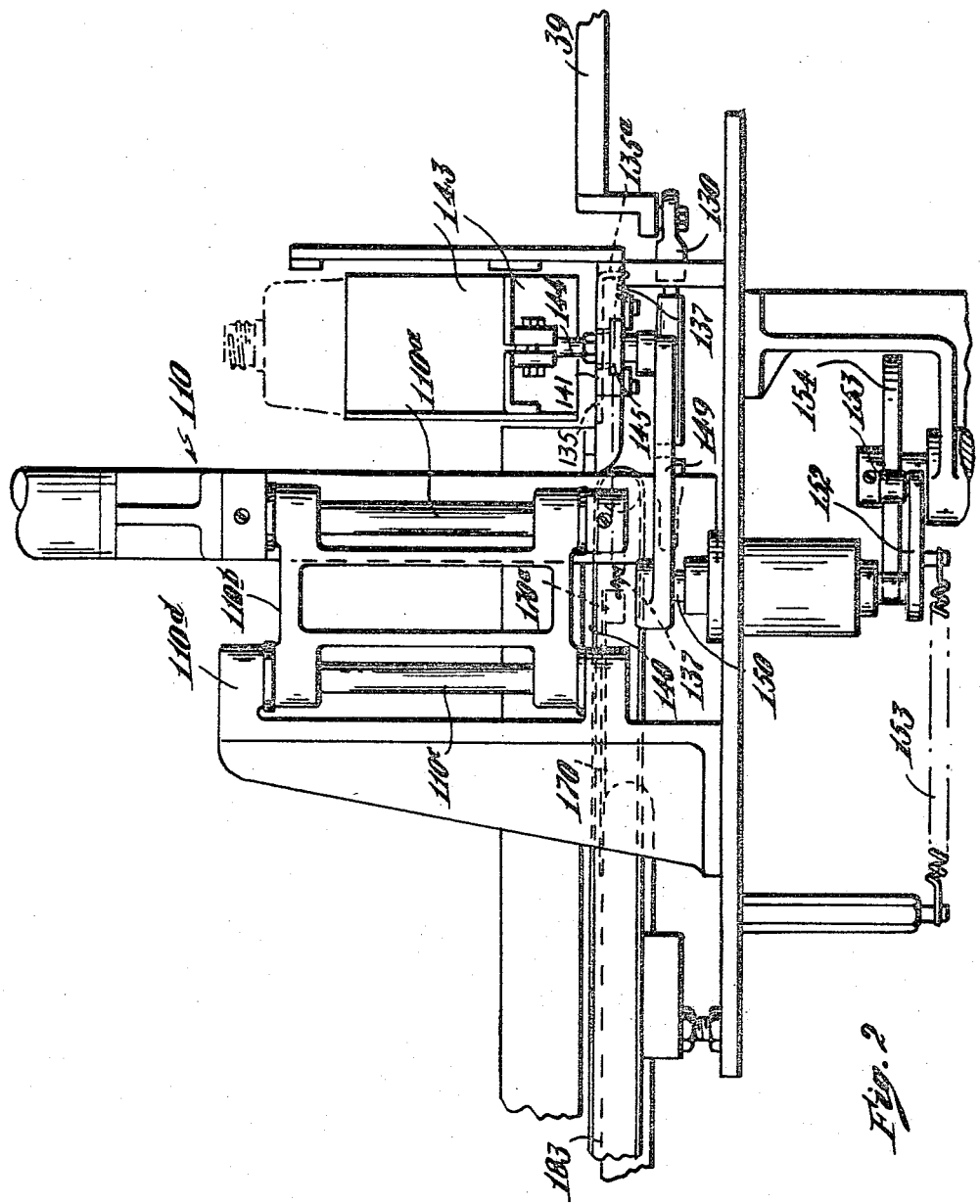
FIG. 2 is a front elevation with some parts omitted.

The left hand extreme position of the cup is normally occupied by plate 170, FIGS. 1 and 2, slidable in a guide-way 171 and urged toward its position of FIG. 1 by the previously mentioned spring 137, FIG. 3, but displaceable to the left in FIG. 1 or away from the observer in FIG. 3 by the cup 100. As indicated in FIG. 2 the spring 137 extends from a lug 135a on the movable plate 135 to a lug 170a on the movable plate 170, tending to draw both plates to the stopped positions of FIG. 1.

A spring-urged detent 180 is displaced by the bottle carried by the cup, then moves into place behind the bottle. When the nozzle 116 is retracted and the cup returns toward the right, the detent 180 prevents the bottle from following the cup. The plate 170, however, moves to the right, under the bottle, so that the cup returns empty to its right hand position, leaving the bottle on the plate 170. This bottle is displaced from the plate by the next succeeding bottle and is received by an endless conveyor 183, slightly lower than the plate 170.

The guidance of the cup 100 past the transfer line will now be explained. Where a curved surface is to be labeled by a rotary die, the objective is to have this surface in motion about its axis of curvature while receiving pressure from the active die surface. The surface of the illustrated bottle to be acted on by the die is of re-entrant or concave curvature, but the applicability of the invention to the opposite situation, convex curvature, will be readily seen.

A stationary grooved cam 190 whose groove is designated 190a underlies the path of the cup 100 and the groove of this cam receives cam follower rolls 191 which are carried by a double armed lever 192 which is clamped to the sleeve portion 102 of the cup. The shape of this cam groove is such that in passing from the FIG. 8b position to the FIG. 8c position the cup and the label receiving surface of the bottle turn around the axis of curvature of the label receiving surface. In FIGS. 1, 8b and 8c concave portions of the bottle are shown in broken lines, and these may be taken as showing the two concave portions of the bottle substantially at the level of the bottom of the die, at line 8—8 of FIG. 3. The concave bottle surface facing the path of the die 17 is of course the label receiving surface.

In the case of this label receiving surface being of concave or re-entrant curvature, as shown, its axis about which it turns lies on the same side of the label strip S (FIG. 1) as the die axis, rather than on the opposite side as in labeling convex surfaces. With convexly curved bottles, the cam shape could for example have a curvature opposite to that shown.

It will be seen that unlike the typical turret machine, the arcuate path of travel of the bottle, corresponding to its rotation around its axis of curvature, does not require to begin much in advance of the bottle's position where it first encounters the die, nor persist much beyond the bottle's position where it leaves the die. Thus the arc from the FIG. 8b to the FIG. 8c position is only about 22° whereas in typical turret machines the bottle will stay in its arcuate path 180° or longer.

The mid-part of the curved path of travel of the cup 100 and bottle will, together with each endmost part of the path, form an S-like or reverse curve. This S-curvature will be most prominent when, as with the illustrated cam, the cup is relatively quickly oriented in initial movement from bottle-receiving position into the desired path of arcuate travel. Thus in going from the FIG. 8a position to the FIG. 8b position there is counter-clockwise rotation of the cup and the bottle, followed by clockwise rotation from the FIG. 8b position to the FIG. 8c position. Finally from FIG. 8c to FIG. 8d there is again counter-clockwise rotation, but not quite so much as from FIG. 8a to FIG. 8b because the travel from 8c to 8d is shorter than from 8a to 8c and the cup and bottle as 8d are not quite restored to the directions they had at the FIG. 8a position.

As indicated in FIGS. 8c and 8d, guard fingers 160c similar to guard fingers 160b receive the bottle. These are effective to orient the bottle further for reception by the conveyor 183, FIG. 1.

The side of the cup 100 which faces the die carries a bottle restraining member 195 which extends above the lower larger non-concave portion of the bottle and is provided with an inturned edge 196 engaging the lowermost concave portion immediately below the area which receives the label. The function of this is to assist in maintaining definite predetermined concave configuration, and the curvature of this edge 196 will in the usual situation be such that its axis of curvature corresponds to the axis about which the bottle turns during transfer of the label.

I claim:

1. Heat-transfer labeling machine comprising a rotary transfer die, means for leading a continuous label-carrier strip past a line of transfer at which the die transfers labels from the strip onto articles, a holder in which the article is adapted to seat, means for applying a back and forth oscillating movement to the holder in timed relation to the rotation of the die, from one side to the other of the line of transfer, and cam means for guiding the holder in a curved path during such movement thereof.

2. Heat-transfer labeling machine comprising a rotary transfer die, means for leading a continuous label-carrier strip past a line of transfer at which the die transfers labels from the strip onto articles, a holder in which the article is adapted to seat, means for applying a back and forth oscillating movement to the holder in timed relation to the rotation of the die, and cam means for guiding the holder in a curved path during such movement of said holder from an article-receiving position at one side of said transfer line to an article-discharging position at the opposite side of said transfer line.

3. Heat-transfer labeling machine comprising a rotary transfer die, means for leading a continuous label-carrier strip past a line of transfer at which the die transfers labels from the strip onto articles, a holder in which the article is adapted to seat, means for applying a back and forth oscillating movement to the holder in timed relation to the rotation of the die, from one side to the other of the line of transfer, and cam means for guiding the holder in a curved path during such movement thereof, the curvature of path of the holder being such that the holder has generally similar orientation at one position which constitutes an article-receiving position and another position which constitutes an article-discharging position.

4. Heat-transfer labeling machine comprising a rotary transfer die, means for leading a continuous label-carrier strip past a line of transfer at which the die transfers labels from the strip onto articles, a holder in which the article is adapted to seat, means for applying a back and forth oscillating movement to the holder in timed relation to the rotation of the die, from one side to the other of the line of transfer, and cam means for guiding the holder in a curved path while the article held thereby is crossing the line of transfer.

5. Heat-transfer labeling machine as claimed in claim 4 in which the path of the label receiving surface of the article during transfer is of curvature directed similarly to that of the path of the die surface but of larger radius; whereby a re-entrant curved surface of the article may be presented tangentially of the label carrier strip and die surface.

6. Heat-transfer labeling machine comprising a rotary transfer die, means for leading a continuous label-carrier strip past a line of transfer at which the die transfers labels from the strip onto articles, a holder for successive articles to be labeled, means for moving the holder in a curved path past the line of transfer, the curvature of said path at said line being of similar direction to that of the die surface but of larger radius, the holder being shaped to engage with the article to turn the article bodily as the holder moves in said path, whereby a curved normally re-entrant surface of the article may be presented tangentially of the label carrier strip and die surface at the line of transfer as the article turns bodily.

7. Heat-transfer labeling machine comprising a rotary transfer die, means for leading a continuous label-carrier strip past a line of transfer at which the die transfers labels from the strip onto articles, a holder in which the article is adapted to seat, means for applying a back and forth oscillating movement to the holder in timed relation to the rotation of the die, from one side to the other of the line of transfer, and cam means for guiding the holder in a curved path during such movement thereof, a part of said curved path which includes passage across the line of transfer and another part of said curved path together forming a reversed curve.

8. Heat-transfer labeling machine comprising a rotary transfer die, means for leading a continuous label-carrier strip past a line of transfer at which the die transfers labels from the strip onto articles, a holder in which the article is adapted to seat, means for applying a back and forth oscillating movement to the holder in timed relation to the rotation of the die, from one side to the other of the line of transfer, and cam means for guiding the holder in a curved path during such movement thereof, a mid-part and each end part of said curved path comprising a reversed curve.

References Cited in the file of this patent

UNITED STATES PATENTS

| | | |
|---|---|---|
| 2,741,389 | Carter | Apr. 10, 1956 |
| 2,754,990 | Scott | July 17, 1956 |
| 2,981,432 | Flood | Apr. 25, 1961 |

FOREIGN PATENTS

| | | |
|---|---|---|
| 468,077 | Canada | Sept. 12, 1950 |